Patented Aug. 30, 1932

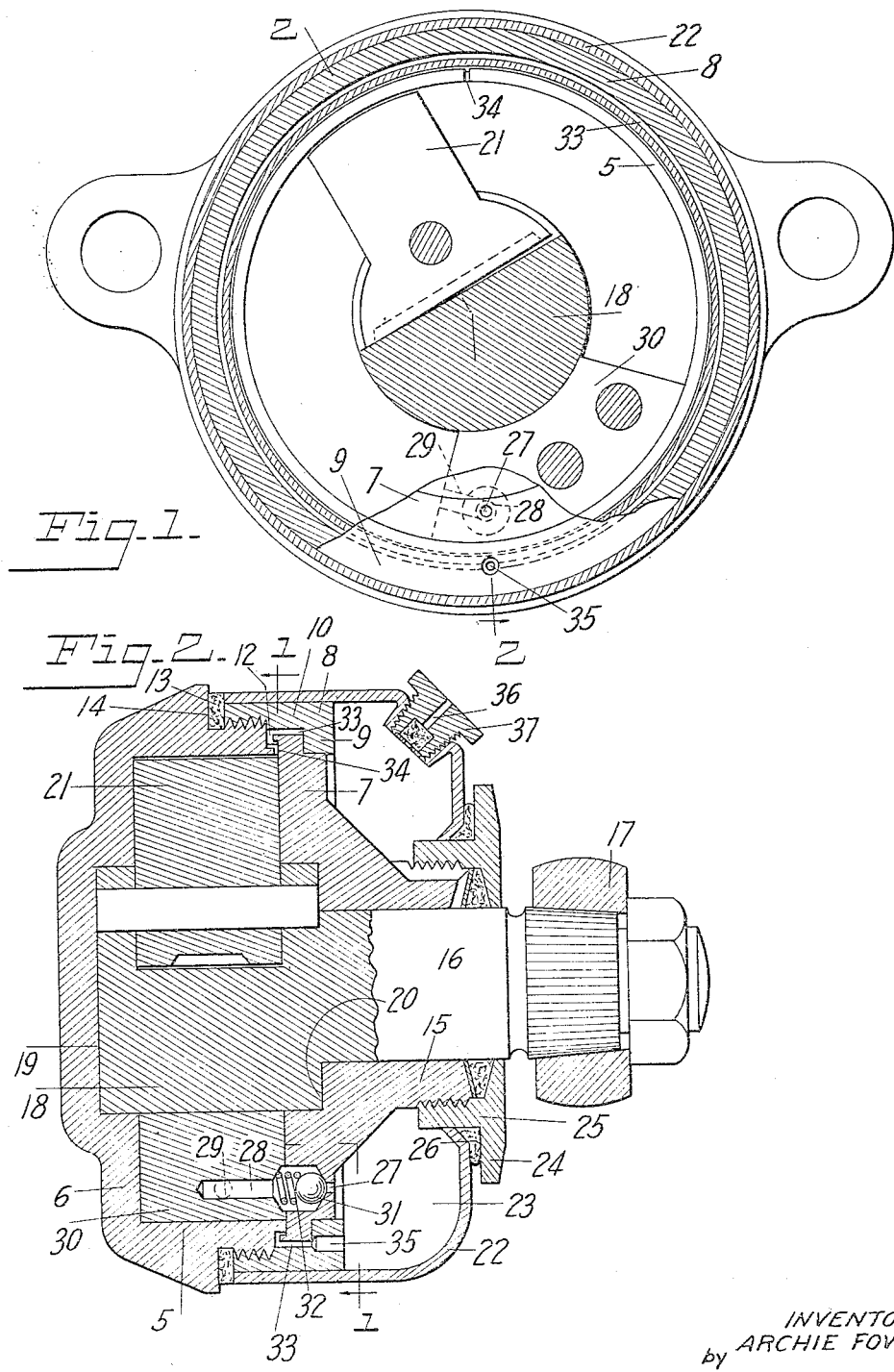

1,874,485

UNITED STATES PATENT OFFICE

ARCHIE FOWBLE, OF DAYTON, OHIO

HYDRAULIC SHOCK ABSORBER FOR AUTOMOBILES AND THE LIKE

Application filed June 6, 1929. Serial No. 368,762.

This invention relates to hydraulic shock absorbers for automobiles and the like.

In the use of hydraulic shock absorbers it has been found that the agitation or "churning" of the liquid by the piston, particularly when the automobile is moving at a high speed, will cause the liquid to heat to an extent which is detrimental to the proper operation of the shock absorber; and, further, that gas will form in the work chamber and prevent the uniform retardation of the piston, due to the fact that the gas will gather in pockets which offer less resistance to the movement of the piston than does the liquid.

One object of the invention is to provide a shock absorber having means for cooling the liquid by causing it to circulate through the supply reservoir.

A further object of the invention is to provide a shock absorber having means for discharging gas from the cylinder without permitting air to enter the cylinder.

A further object of the invention is to provide a shock absorber having the above mentioned characteristics without substantial modification of the structure thereof.

Other objects of the invention will appear as the device is described in detail.

In the accompanying drawing, Fig. 1 is a transverse sectional view of a shock absorber taken on the line 1—1 of Fig. 2; and Fig. 2 is a vertical section of a shock absorber taken on the line 2—2 of Fig. 1.

In the drawing I have illustrated one embodiment of my invention and have shown the same as applied to a shock absorber of a well known type, but it will be understood that this particular embodiment has been chosen for the purpose of illustration only and that the invention may take various forms and may be applied to shock absorbers of various kinds.

The shock absorber here illustrated is of the oscillating type and comprises a cylinder 5 permanently closed at one end by an end wall 6 and closed at its other end by a removable sealing plate 7 which has sealing contact with the edge of the cylinder and is held in place thereon by a coupling member, which is here shown as a ring screw threaded onto the cylinder and having an inwardly extending circumferential flange 9 which overhangs the edge of the sealing plate and clamps the same firmly onto the cylinder. Preferably the sealing plate has a circumferential flange 10 which extends axially thereof and is seated in a circumferential groove or rabbet 12 in the end portion of the cylinder. The inner end of the coupling member 8 engages a packing ring 13 seated on a circumferential shoulder 14 extending about the cylinder and thus provides a liquid tight joint between the coupling member and the cylinder. The sealing plate has an elongated central portion or hub 15 which constitutes a bearing in which is journaled a shaft 16, one end of which projects beyond the shock absorber and has means for rigidly securing thereto an actuating arm 17. The other end of the shaft extends into the cylinder and is enlarged, as shown at 18, and this enlarged portion is seated at its ends in recesses 19 and 20 formed respectively in the end wall 6 and the sealing plate 7. Carried by this enlarged portion of the shaft is a wing piston 21 which is here shown as pivotally mounted in a lateral recess in the shaft and so arranged with relation to the shaft that the latter may have a slight movement with relation to the piston before movement is imparted to the latter. Mounted about the sealing plate 7 and coupling member 8 is a casing 22 so arranged as to form between the same and the sealing plate a supply reservoir 23. As here shown, this casing is cup-shaped and its open end fits snugly about the coupling member 8 and contacts with the packing ring 13. The outer wall of the casing has a central opening through which the hub 15 of the sealing plate extends and a flange 24 on a packing gland 25, which is threaded onto the hub 15, overhangs the outer wall of the casing and serves to retain the same in place and to press the inner edge thereof against the packing ring. Preferably a packing ring 26 is interposed between the flange 24 and the outer wall of the casing. The supply reservoir 23 communicates with the interior of the cylinder, or the work chamber, by means of a suitable passageway which is so controlled as to permit liquid to be drawn from the supply reservoir to the work chamber by the action of the piston but to prevent the passage of liquid from the work chamber to the supply reservoir. In the present construction, this passageway comprises a port 27 formed in the sealing plate and communicating with ports or conduits 28 and 29 in an abutment 30, which is rigidly mounted in the work chamber and cooperates with the piston 21 to divide the work chamber into two parts. The port 27 in the sealing plate has its inner portion enlarged to receive an outwardly closing check valve, such as a ball 31 acted upon by a spring 32.

The shock absorber so far described is substantially similar to a shock absorber heretofore known and in applying my invention thereto I have provided means whereby on each complete operation of the piston a small quantity of liquid will be forced from the work chamber into the supply reservoir and a corresponding quantity of liquid withdrawn from the supply reservoir, through the port 27, to the work chamber, thus maintaining the work chamber full at all times but causing the liquid to circulate from the work chamber through the reservoir and thus cooling the same. I have also provided means whereby the gas accumulating in the work chamber will be discharged therefrom into the supply reservoir at a point below the level of the liquid in the latter, thus enabling all gas to be discharged from the work chamber but preventing any air from being drawn into the same. In the present construction the gas escapes through the same outlet through which liquid is discharged from the work chamber to the reservoir. To accomplish this result I prefer to provide the cylinder with a conduit leading therefrom, at a point adjacent to the neutral position of the piston, and discharging into the supply reservoir at a point which will be normally below the level of the liquid in the reservoir, this point being preferably located adjacent to or below the horizontal plane of the port 27. Consequently so long as the reservoir contains sufficient liquid to replenish the losses in the work chamber the discharge end of the conduit will be sealed.

The conduit may be of any suitable character and arrangement. In the present instance, I have formed it in the wall of the cylinder, it being understood, of course, that the sealing plate and coupling member form parts of the cylinder. In the construction here illustrated the body portion of the coupling member 8 is of an internal diameter slightly greater than the diameter of the sealing plate and a channel or conduit 33 is formed between these members and extends entirely about the cylinder. This conduit communicates with the interior of the cylinder, or work chamber, through a passageway or port which, in the present instance, is formed in that edge of the cylinder proper which communicates with the sealing plate, as shown at 34. The flange 10 of the sealing plate is usually of such an internal diameter and of such a width that it will not have sealing contact with the adjacent surfaces of the circumferential recess 12 and consequently will permit the passage of the liquid from the port or notch 34 to the conduit 33. Should there not be sufficient clearance between the flange and the adjacent surfaces of the recess to permit of the free passage of the liquid the latter may be notched to provide a passageway which will connect the passageway 34 with the conduit 33. The outlet passage 34 is arranged near the neutral position of the piston, and in the construction here shown, where the abutment is in the lower part of the cylinder and the piston in the upper part of the cylinder, the outlet passage may be at the top of the cylinder. The conduit 33 is connected with the supply reservoir through a port 35 which, in the present instance, is formed in the flange of the coupling member. This port may be arranged in any position in which it will normally be below the level of the liquid in the supply reservoir but by placing it adjacent to or below the horizontal plane of the port 27 it will be sealed by the liquid in the reservoir at all times when the reservoir contains sufficient liquid to replenish the work chamber.

The operation of the apparatus will be readily understood from the foregoing description and it will be apparent that upon each stroke of the piston to the right, in Fig. 1, a small quantity of liquid and any gas which may have accumulated in the upper portion of the work chamber will be forced through the conduit 33 into the supply reservoir and at the same time a corresponding quantity of liquid will be drawn from the reservoir through the port 27 into the work chamber. In this manner a circulation of the liquid is provided which, as has been found in practice, will completely change the liquid in the work chamber within a few minutes and will thereby prevent the excessive heating of the liquid in the work chamber. The gas which is forced through the conduit will be discharged into the supply reservoir below the level of the liquid therein and will rise through the liquid and be discharged from the reservoir through the usual breather port which, in the present instance, is shown at 36 as formed in the plug 37 which closes the filling opening for the reservoir. Inasmuch as the outer end of the conduit is sealed by the liquid in the reservoir no air can be drawn into the work chamber through the passageway 33. The action of the piston may draw a small quantity of liquid from the reservoir through the passageway 33 into the work chamber but this will merely assist in maintaining the work chamber full of liquid and will in no way affect the normal operation of the device.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a hydraulic shock absorber, a structure having a work chamber, a supply reservoir and an inlet passageway leading from said reservoir to said work chamber, a piston mounted in said work chamber, and a conduit leading from said work chamber at a point adjacent to the neutral position of said piston and communicating with said reservoir at a point near the horizontal plane of said inlet passageway.

2. In a hydraulic shock absorber, a structure having a work chamber, a supply reservoir arranged alongside of said work chamber and an inlet passageway leading from the lower portion of said reservoir to said work chamber, a piston mounted in said work chamber, and a conduit leading from the upper portion of said work chamber to the lower portion of said reservoir.

3. In a hydraulic shock absorber, a structure having a work chamber, a supply reservoir and an inlet passageway leading from the lower portion of said reservoir to said work chamber and having means to prevent the escape of liquid from said work chamber through said inlet passageway, an oscillatory piston mounted in said work chamber, and a conduit communicating with said work chamber near the neutral position of said piston and leading to the lower portion of said reservoir.

4. In a hydraulic shock absorber, a cylinder, an oscillatory piston mounted in said cylinder, a supply reservoir arranged at one end of said cylinder, an inlet passageway leading from the lower portion of said reservoir to said cylinder and having means to prevent the flow of liquid from said cylinder to said reservoir through said passageway, and a conduit formed in a wall of said cylinder, communicating with said cylinder and communicating with the lower portion of said reservoir.

5. In a hydraulic shock absorber, a cylinder, an oscillatory piston mounted in said cylinder, a supply reservoir arranged at one end of said cylinder, an inlet passageway leading from the lower portion of said reservoir to said cylinder and having means to prevent the flow of liquid from said cylinder to said reservoir through said passageway, and a conduit formed in a wall of said cylinder, communicating with said cylinder at a point near the neutral position of said piston and communicating with said reservoir at a point near the horizontal plane of said inlet passageway.

6. In a hydraulic shock absorber, a cylinder having a work chamber, a sealing plate for one end of said cylinder, a coupling member to secure said sealing plate to said cylinder, said sealing plate and said coupling member being arranged to form a conduit between the same, a port connecting said conduit with said work chamber, an oscillatory piston mounted in said work chamber, a supply reservoir arranged on the outer side of said sealing plate, a port connecting said conduit with the lower portion of said reservoir, said sealing member having an inlet passageway leading from said reservoir to said work chamber, and a check valve to control the flow of liquid through said inlet passageway.

7. In a hydraulic shock absorber, a cylinder having a work chamber, an oscillatory piston mounted in the upper portion of said work chamber, an abutment in the lower portion of said work chamber, a sealing plate to engage the end of said cylinder and close said work chamber, a coupling member to secure said sealing plate to said cylinder, said sealing plate and said coupling member being arranged to form between them a circumferential conduit, a supply reservoir on the outer side of said sealing plate, a passageway formed between said sealing plate and said cylinder to connect said conduit with the upper portion of said work chamber, a passageway in said coupling member to connect said conduit with the lower portion of said reservoir, an inlet passage way in said sealing member to connect said reservoir with said work chamber, and a check valve in the last mentioned passageway.

In testimony whereof, I affix my signature hereto.

ARCHIE FOWBLE.